United States Patent [19]

Butcher et al.

[11] Patent Number: 4,575,863

[45] Date of Patent: Mar. 11, 1986

[54] FAST RECOVERY BIAS CIRCUIT

[75] Inventors: James S. Butcher, Phoenix, Ariz.;
Charles G. Rousch, Streamwood, Ill.

[73] Assignee: Motorola, Inc., Schaumburg, Ill.

[21] Appl. No.: 564,974

[22] Filed: Dec. 22, 1983

[51] Int. Cl.[4] .............................................. H04L 7/00
[52] U.S. Cl. ....................................... 375/114; 307/540
[58] Field of Search ................. 375/76, 106, 111, 114, 375/113; 307/356, 358, 540, 542, 544, 546, 549; 328/63, 72

[56] References Cited

U.S. PATENT DOCUMENTS

| 3,585,298 | 7/1971 | Liberman | 328/63 |
|---|---|---|---|
| 3,681,698 | 8/1972 | McEvoy | 455/161 |
| 3,706,091 | 12/1972 | May, Jr. | 375/76 |
| 4,021,739 | 5/1977 | Baum et al. | 375/36 |
| 4,029,904 | 6/1977 | Papeschi | 375/76 |
| 4,038,605 | 7/1977 | Elder et al. | 375/114 |
| 4,215,239 | 7/1980 | Gordy et al. | 375/114 |
| 4,320,517 | 3/1982 | Godard et al. | 375/13 |
| 4,352,193 | 9/1982 | Acker | 375/76 |
| 4,387,465 | 6/1983 | Becker | 375/76 |
| 4,433,425 | 2/1984 | de Jaeger | 375/113 |

Primary Examiner—Robert L. Griffin
Assistant Examiner—Stephen Chin
Attorney, Agent, or Firm—James E. Jacobson, Jr.; Edward M. Roney; Donald B. Southard

[57] ABSTRACT

A programmable bias circuit for use with a data limiter circuit is described. The limiter and bias circuit are coupled to a portable data receiver which is adapted to communicate in a coded system. Frequency disparities between a transmitted word sync signal and the portable data terminal local oscillator signal will cause a DC offset voltage in the received data signal. The programmable bias circuit is controlled by a decoder within the portable data terminal. If the terminal is in an idle state, the programmable bias circuit will be set to rapidly follow offset voltage shifts until a transmitted word sync signal has been detected. After word sync has been detected, a slower, more stable time constant circuit is programmably activated for the duration of the digital data message. The fast time constant circuit is activated at the end of the received data signal.

4 Claims, 4 Drawing Figures

FAST RECOVERY BIAS CIRCUIT

BACKGROUND OF THE INVENTION

1. Field of the Invention

This invention relates to the field of portable communication systems and specifically to a data transceiver circuit which can adaptively alter the receiver limiter operating bias level, based on the detection of data sync word.

2. Description of the Prior Art

Portable radio transceivers are used in several facets of communications technology. Portable data transceivers can be found in paging systems, and two-way communication systems such as those used by police and other public servants. Recently, portable radio transceivers have found use in portable data terminals which are used to communicate with a host computer. Portable data terminals of this type can provide on site computer dianostics of a second host computer.

Most devices which are used for data communications are operated in a synchronous mode. That is, the local clock signal used to operate the portable data terminal is phase compensated so the transitions of the local clock signal are aligned with the transitions of an incoming data signal. In most portable data receiver applications, a data receiver output signal is coupled to a data limiter circuit, which provides binary 1-0 information to a data decoder.

In portable data receivers of this type, a difference in the crystal frequencies of the receiver and transmitter in a radio system will cause an offset voltage to be superimposed on the received signal. The offset voltage may prevent the receiver limiter circuit from switching at the proper threshold point. In the limiter stage, the bias level may be adjusted to compensate for the offset voltage to maintain maximum duty cycle. However, once a word sync signal has been detected, the bias level must not vary when the binary message signal contains long strings of consecutive "ones" or "zeros". The abovementioned problems are compounded when several portable data transceivers are used in a system. Since the crystal frequencies of each portable unit are generated independently, each portable unit will exhibit unique offset voltage characteristics.

Several prior art techniques have addressed the offset voltage problem. One technique attempts to correct all DC level disturbances in received data so that a fixed decision level can be utilized in the limiter circuit. Another technique attempts to correct offset voltage disturbances by adjusting the receiver local oscillator frequency until the received signal and the local oscillator are in lock. The resulting circuitry for both of these techniques is quite complex and may be undesirable in a portable unit with limited space and power source capabilities.

SUMMARY OF THE INVENTION

Accordingly, for the foregoing and other shortcomings, it is an object of the present invention to provide a data limiter bias circuit which can be programmably altered after a data signal has been detected.

It is yet another object of the present invention to provide a data limiter bias circuit which can adapt to offset voltage shifts in a received data signal.

It is still another object of the present invention to provide a data limiter bias circuit which allows rapid shifts in the limiter bias level before and during the acquisition of a word sync signal.

It is still another object of the present invention to provide a data limiter bias circuit which prevents rapid shifts in the limiter bias level for the duration of a digital data message.

Briefly described, the present invention contemplates a fast recovery bias circuit which is programmably switched after the detection of a word sync signal. At the end of the word sync signal, the bias circuit is set for a relatively long time constant for the duration of a data message. The bias circuit is then adjusted for a relatively short time constant at the end of the digital message.

DETAILED DESCRIPTION OF THE PREFERRED EMBODIMENT

Figure 1:
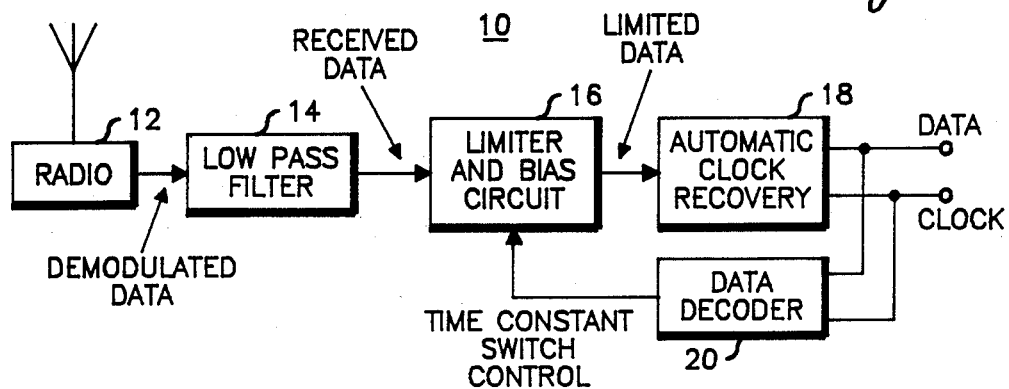
FIG. 1 is a block diagram of a digital data receiver of the type which could be used in accordance with the present invention.

The fast recovery bias circuit 16 is used in a digital data receiver such as the type shown in FIG. 1 The digital data receiver 10 includes a conventional radio receiver 12. The radio receiver 12 receives a RF signal and provides a demodulated output of base band data which is low-pass filtered by filter 14. The received data signal is coupled to the fast recovery bias circuit 16 of the present invention. The limited data output of the fast recovery bias circuit 16 is typically processed by an automatic clock recovery circuit 18 which recovers a clock signal from the limited data signal.

An automatic clock recovery circuit 18 suitable for use with the present invention is described in a United States Patent Application attorneys docket no. CM00178G entitled "Automatic Clock Recovery Circuit" by the inventor of the present invention, assigned to the assignee of the present invention and filed the same day as the present application and further incorporated herein by reference. A programmable data decoder 20 is coupled to the data and clock output terminals of the automatic clock recovery circuit 18. The programmable data decoder 20 will be discussed in more detail below, however, the data decoder 20, continuously monitors the received digital data signal for a coded message. The coded digital message is preceded by a specific binary pattern called word sync, which signals the beginning of a message or message group and is used to align the transitions of the receiver local clock to the transitions of a received data signal. Since the portable transceivers and the various base stations used in a system may all have slightly different crystal local oscillator frequencies, the DC offset component in the received word sync signal will vary from unit to unit. A suitable coded data signal and signalling format for use with the present invention is described in U.S. Patent Application by Timothy Burke et al. entitled "Data Signalling System" Ser. No. 402,682, filed July 28, 1982, and assigned to the assignee of the present invention, and herein incorporated by reference.

If the digital data receiver is in an idle state, the data decoder circuit 20 will set the fast recovery bias circuit 16 to respond to rapid variations in the DC offset voltage in a received data signal. In other words, while the data decoder is searching for word synch, the bias circuit is set to rapidly adjust the reference threshold in the limiter circuit to the average voltage of the incoming data signal.

After word sync has been detected, the data decoder sets the fast recovery bias circuit to prevent threshold voltage changes which may occur due to the DC offset changes caused by long strings of ones and zeros. At the end of the digital message the data decoder 20 restores the ability of the bias circuit 16 to respond to rapid variations in DC offset voltage.

Figure 2:
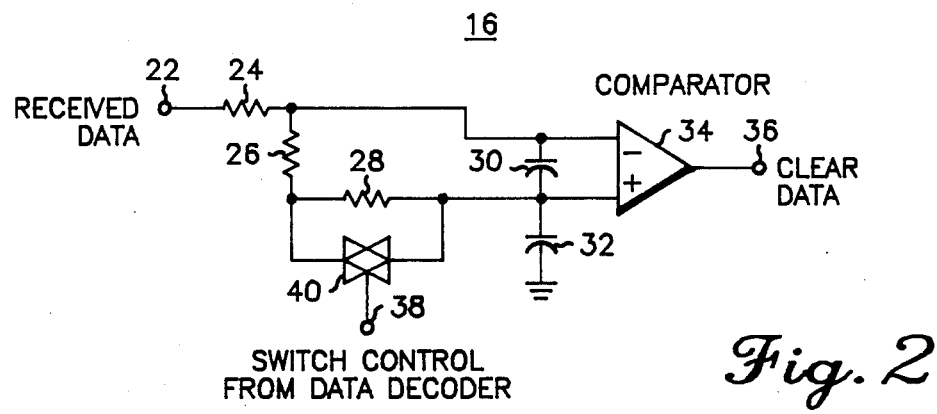
FIG. 2 is a schematic diagram of the preferred embodiment of the bias circuit of the present invention.

FIG. 2 shows a detailed electrical schematic of the preferred embodiment of the fast recovery bias circuit 16 constructed in accordance with the present invention. The fast recovery bias circuit 16 operates in conjunction with a programmable data decoder 20 which controls the programmable input 38. A data decoder suitable for use with the present invention is described in U.S. patent application Ser. No. 441,327 entitled "Method and Apparatus For Dynamically Selecting Transmitters For Communications Between A Primary Station and Remote Stations of Data Communications System, by Thomas A. Freeburg and filed Nov. 11, 1982, and assigned to the assignee of the present invention and incorporated by reference hereto. The data decoder 20 described in the above-mentioned reference utilizes a microprocessor which operates under the control of a program and several subroutines. A subroutine suitable for use with the data decoder 20 will be discussed in more detail below.

According to FIG. 2, the fast recovery bias circuit 16 comprises resistors 24, 26 and 28; capacitors 30 and 32; switch 40 and comparator 34. The combination of resistors 24 and 26 and capacitor 32 form a low pass filter with a corner frequency of approximately 50 Hz when switch 40 is activated. Capacitor 32 rapidly charges to the average voltage of the received data signal. The junction of capacitors 30 and 32 is used to set the voltage at the voltage reference input of comparator or limiter 34. Comparator 34 processes the received data signal to provide binary 1-0 information to the automatic clock recovery circuit 18 and data decoder 20. Capacitor 30 which, is typically 50-100PF, suppresses high frequency noise at the comparator input.

If a word sync binary pattern is detected by the data decoder 20 of FIG. 1, switch 40 is deactivated, which reduces the corner frequency of the input circuit to approximately 5 Hz. The increased time constant prevents reference voltage shifts which could normally occur due to long strings of ones and zero's in a binary signal pattern.

Figure 3:
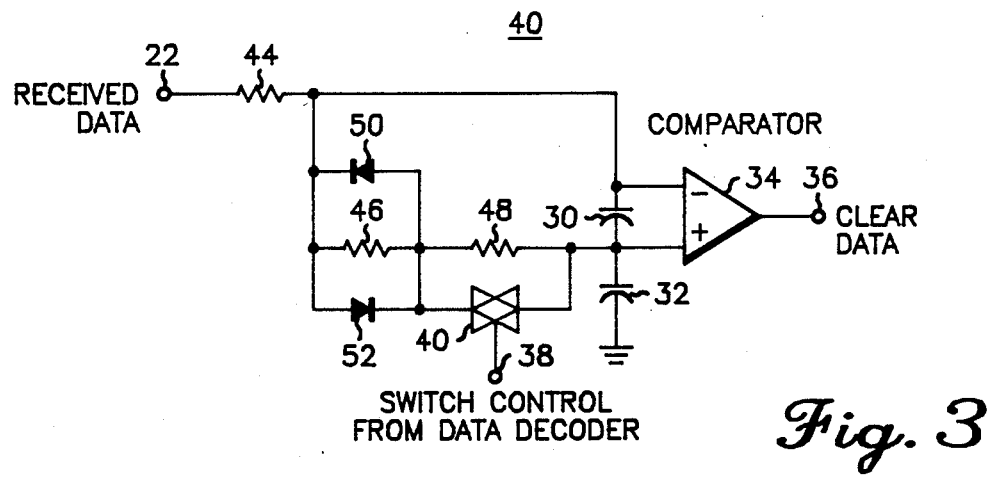
FIG. 3 is a schematic diagram of a second embodiment of the bias circuit of the present invention.

Referring now to FIG. 3, a schematic diagram of a second embodiment of the bias circuit of the present invention is shown. According to FIG. 3, and received data is coupled to resistor 44. Resistor 44 is coupled to capacitor 30, diodes 50 and 52 and resistor 46. A capacitor 32 is placed between the reference input (+) of comparator 34 and ground. Switch 40 and resistor 48 are coupled, in parallel, between the common junction of diodes 50, 52 and resistor 46 and the common junction of capacitor 30 and 32.

When switch 40 is activated, capacitor 32 rapidly charges to the average voltage of the incoming data signal. Diodes 50 and 52 allow fast average voltage recovery in the presence of DC voltage offsets exceeding 0.6 v. Deactivating switch 40 causes the input circuit to switch to a longer time constant to be applied to the reference terminal of comparator 34.

Figure 4:
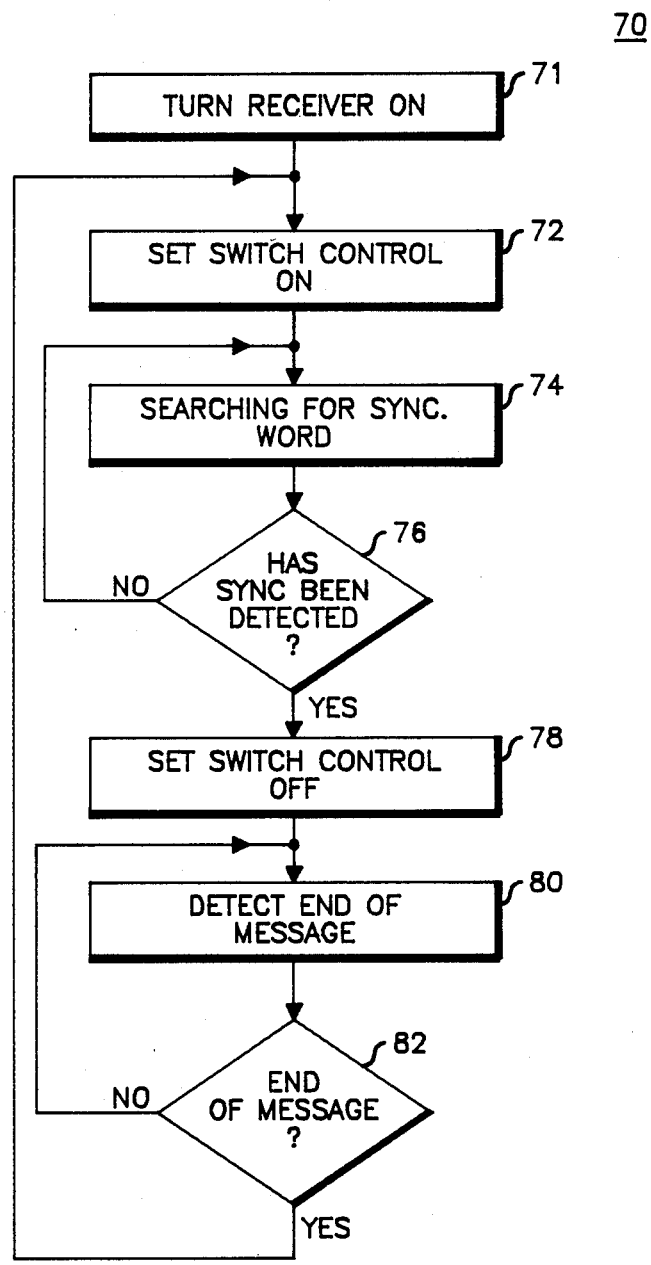
FIG. 4 is a flow diagram detailing the method for adjusting the data limiter bias circuit in accordance with the practice of the present invention.

FIG. 4 shows a flow diagram detailing an algorithm for controlling a data decoder 20 in accordance with the present invention. According to FIG. 4, the routine 70 is entered at item 71 when the digital data receiver 12 is activated. Item 72 then sets the switch control of FIGS. 2 and 3 ON. The routine proceeds to item 74 and decision 76, which sets the data decoder 20 to continuously monitor the received digital data signal for a word sync pattern. If word sync has been detected, the routine selects item 78 which deactivates the switch control line shown in FIGS. 2 and 3. If word sync has not been detected, the routine will remain in a loop between decision 76 and item 74.

After the switch control is set, the routine proceeds to item 80 and decision 82 which form a loop for detecting the end of a received coded digital signal. If the end of message has been detected, item 72 sets the switch control 38, returning the fast recovery bias 16 circuit to the short time constant state.

In summary, a fast recovery bias circuit with computer activated time constant has been described. The bias circuit and a limiter are coupled to a data decoder. If a word sync pattern has not been detected, the data decoder sets the bias circuit to a short time constant state. If word sync is detected, the data decoder sets the bias circuit to a relatively long time constant for the duration of the coded digital message. The bias circuit is returned to the short time constant state at the end of the digital message. Accordingly, other modifications uses and embodiments will be apparent to one skilled in the art without departing from the spirit and scope of the principles of the present invention.

What is claimed is:

1. A method for adaptively adjusting a data limiter bias circuit having a plurality of time constants which are programmably controllable in response to a received data signal, said method comprising the steps of:
    (a) receiving a data signal having a digital word sync pattern followed by a digital data message;
    (b) detecting the end of said digital word sync pattern and the completion of the digital data message in the received data signal;
    (c) switching the time constant of the receiver data limiter bias circuit, to a relatively long time constant, when the end of the word sync pattern is detected; and
    (d) swtiching the time constant of the receiver data limiter bias circuit, to a relatively short time constant at the completion of the digital data message.

2. A data receiver circuit for adaptively adjusting a data limiter bias time constant in accordance with a control signal derived from a received data signal having a digital word sync pattern followed by a digital data message, said data receiver circuit having a plurality of programmably controlled time constants, comprising:
    (a) limiter means for generating a limited output signal derived from the received data signal;
    (b) bias circuit means having first and second time constants, coupled to said limiter means, for generating a bias voltage which can vary at a rate determined by one of said first or second time constants; and (c) decoder means coupled to said limiter means and said bias circuit means for detecting said digital word sync pattern therein and selectively activating said second time constant at the end of the digital word sync pattern and activating said first time constant at the end of the digital data message.

3. An adaptive data limiter bias circuit having a plurality of time constants which are programmably controllable in response to a received data signal, comprising:

(a) means for receiving a data signal having a digital word sync pattern and the completion of the digital data message;

(b) means for detecting the end of said digital word sync pattern followed by a digital data message in the received data signal;

(c) means for switching the time constant of the receiver data limiter bias circuit, to a relatively long time constant, when the end of the word sync pattern is detected; and (d) means for switching the time constant of a receiver data limiter bias circuit, to a relatively short time constant, at the completion of the digital data message.

4. A data receiver circuit for adaptively adjusting a data limiter bias time constant in accordance with a control signal derived from a received data signal having a digital word sync pattern followed by a digital data message, said data receiver circuit having a plurality of programmably controlled time constants, comprising:

(a) limiter means for generating a limited output signal derived from the received data signal;

(b) bias circuit means having first and second time constants, coupled to said limiter means, for generating a bias voltage which can vary at a rate determined by on of said first or second time constants; and (c) means coupled to said limiter means and said bias circuit means for detecting said digital word sync pattern therein and selectively activating said second time constant at the end of the digital word sync pattern and activating said first time constant at the end of the digital data message.

* * * * *